(12) United States Patent
Sauerlaender et al.

(10) Patent No.: US 8,810,071 B2
(45) Date of Patent: Aug. 19, 2014

(54) WIRELESS POWER TRANSMISSION SYSTEM

(75) Inventors: Georg Sauerlaender, Aachen (DE); Eberhard Waffenschmidt, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 972 days.

(21) Appl. No.: 12/935,045

(22) PCT Filed: Mar. 31, 2009

(86) PCT No.: PCT/IB2009/051346
§ 371 (c)(1), (2), (4) Date: Sep. 28, 2010

(87) PCT Pub. No.: WO2009/122355
PCT Pub. Date: Oct. 8, 2009

(65) Prior Publication Data
US 2011/0025133 A1    Feb. 3, 2011

(30) Foreign Application Priority Data
Apr. 3, 2008    (EP) .................................. 08103351

(51) Int. Cl.
*H02J 17/00* (2006.01)

(52) U.S. Cl.
USPC ......................................... 307/104; 320/108

(58) Field of Classification Search
USPC ......................................... 307/104; 320/108
See application file for complete search history.

(56) References Cited

U.S. PATENT DOCUMENTS

| 6,212,430 | B1 * | 4/2001 | Kung .............................. 607/61 |
| 6,803,744 | B1 * | 10/2004 | Sabo ............................. 320/108 |
| 2001/0000960 | A1 | 5/2001 | Dettloff |
| 2007/0182367 | A1 | 8/2007 | Partovi |

FOREIGN PATENT DOCUMENTS

| WO | 8905530 A1 | 6/1989 |
| WO | 9805048 A1 | 2/1998 |
| WO | 2006105184 A1 | 10/2006 |
| WO | 2007031897 A1 | 3/2007 |

* cited by examiner

Primary Examiner — Fritz M Fleming
(74) Attorney, Agent, or Firm — Larry Liberchuk

(57) ABSTRACT

A Wireless power transmission system comprises a base unit (1) with multiple magnetic field generator circuits and a device (10), separable from said base unit (1) having a receiving inductor, adapted to receive power inductively when said device (10) is in proximity to one of said generator circuits, wherein said base unit (1) comprises a controller (3), configured to determine a transmission circuit (2') from said generator circuits when said receiving inductor is in proximity to said transmission circuit (2'), whereupon said transmission circuit (2') is operated to generate a first magnetic field (8), having a first phase, to induce a current in said receiving inductor and at least one of the remaining generator circuits is operated as a compensation circuit (2", 52, 82) to generate a second magnetic field (21), having an opposite phase to said first phase.

12 Claims, 11 Drawing Sheets

FIG. 2a

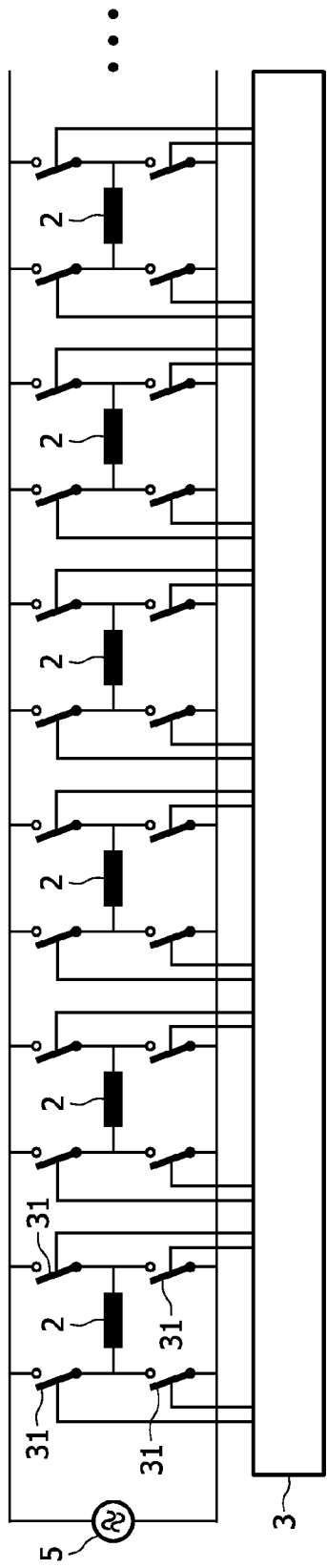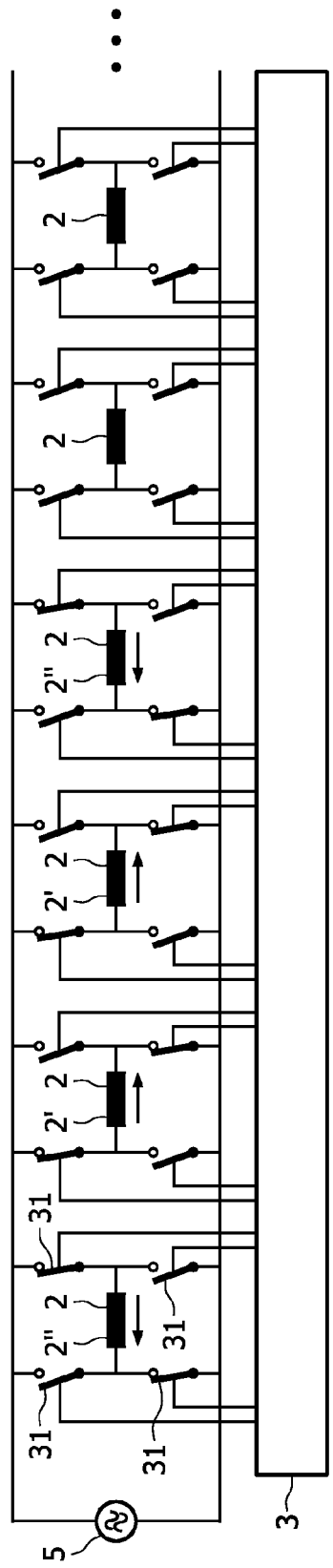

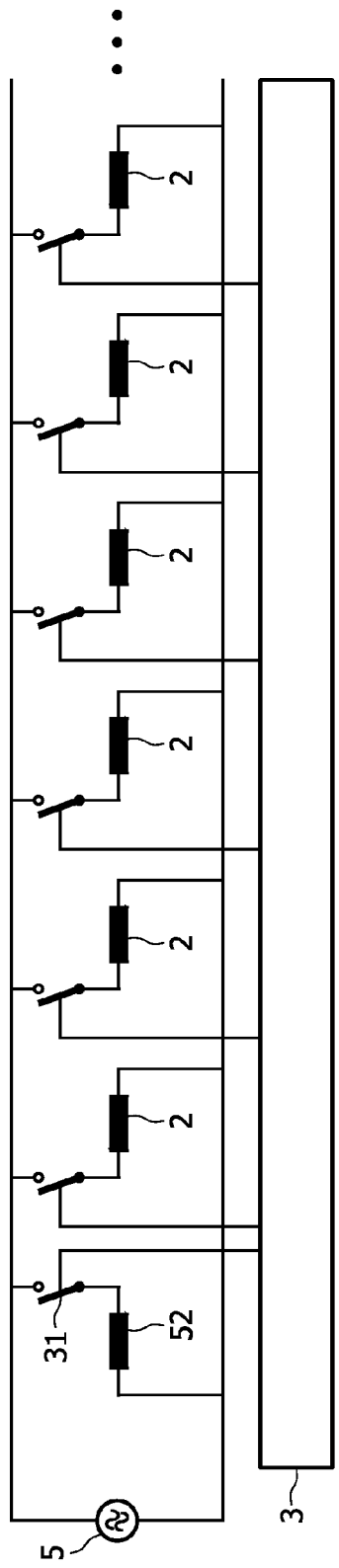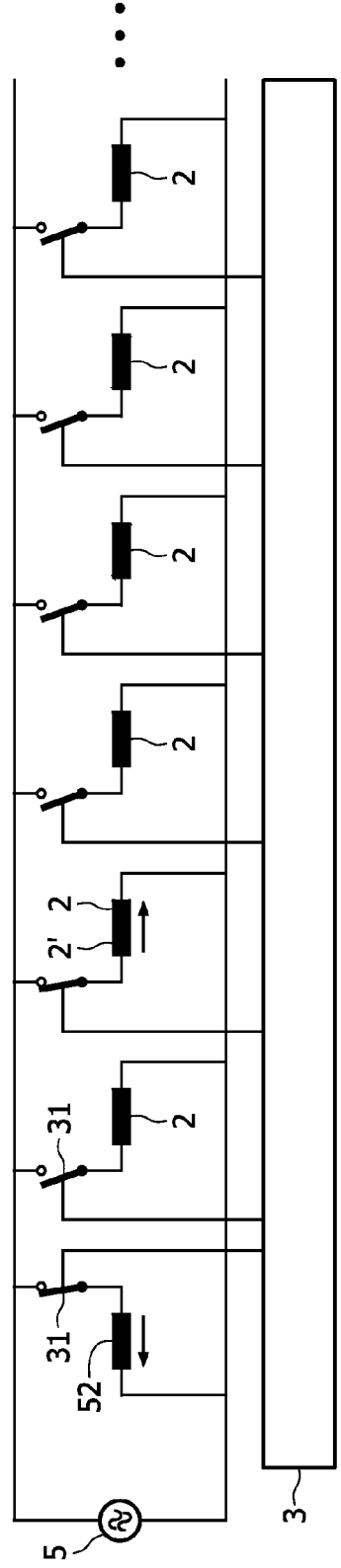

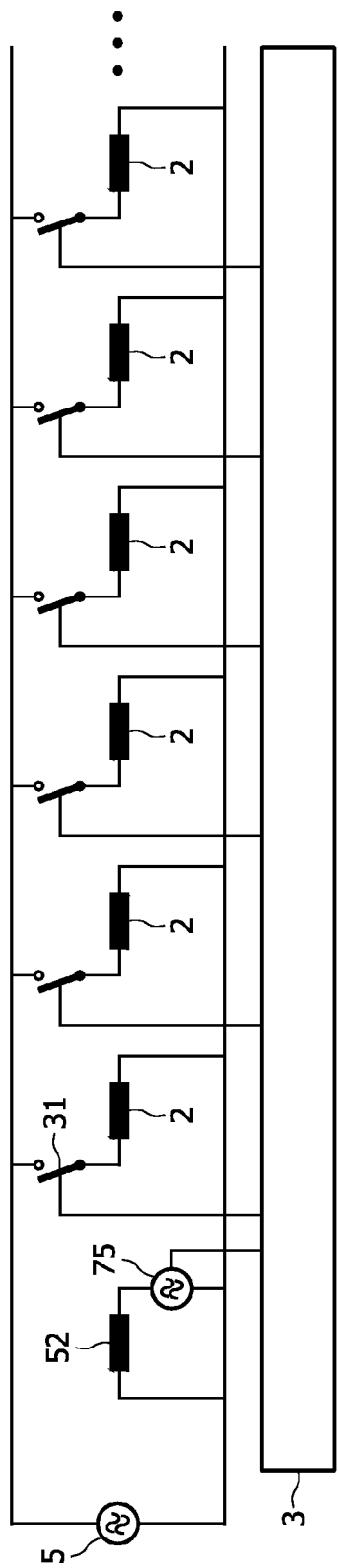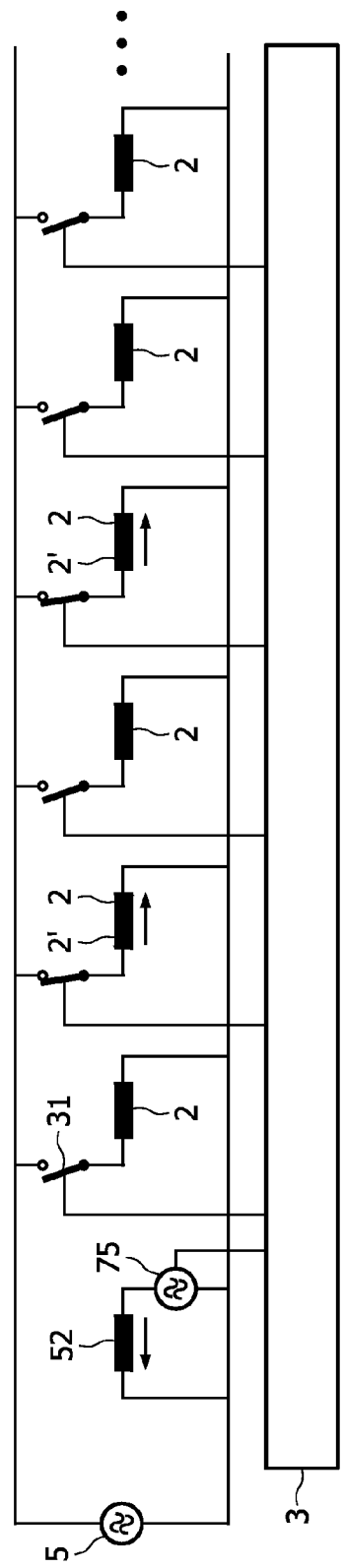
FIG. 7a
FIG. 7b

WIRELESS POWER TRANSMISSION SYSTEM

FIELD OF THE INVENTION

The invention relates to a wireless power transmission system and a method for operating the same.

BACKGROUND OF THE INVENTION

Electronic devices, which are "mobile" or portable, are being used today for various commercial or personal applications. Examples of such devices include mobile phones, notebook computers, personal digital assistants (PDA) or portable music players. The afore-mentioned devices are usually powered by a rechargeable battery, which has to be recharged periodically to keep the device operational. For recharging or for supplying external power, each device normally has a dedicated power supply unit, which has to be connected to the device and to a wall power outlet. Since most devices are not compatible with each other, a dedicated power supply unit is needed for each device.

Due to the fact that the total number of such devices used increases, wireless power sources have been developed, which reduce time and effort of the recharging process. US 2007/0182367A1 discloses such a wireless power source and charging system. A base unit is provided, having a surface for accommodating one or more mobile devices to be recharged. Several inductor coils are provided below the surface for generating a magnetic field, which induces a current in a corresponding coil of each mobile device. Using this current, a rechargeable battery in the mobile device can be recharged easily and without the process of connecting a custom power supply unit to each of the devices to be recharged.

Although the known system allows to wirelessly recharge such a device, the inductor coils in the base unit generate a rather large magnetic stray field which causes problems in EMC-sensitive environments and may cause unwanted interference with further electronic devices.

Accordingly, it is an object of this invention to provide a wireless power transmission system and method for operating such system, in which the magnetic stray field is reduced.

SUMMARY OF THE INVENTION

The object is solved according to the invention by a wireless power transmission system according to claim 1 and a method for operating a wireless power transmission system according to claim 11. Dependent claims relate to preferred embodiments of the invention.

The basic idea of the invention is to provide a wireless electrical power transmission system which enables to transfer power to a device using induction generated by a magnetic field, where the magnetic field is concentrated in the region near the device, i.e. in the magnetic near-field, while the far-field is cancelled-out by a second magnetic field, which advantageously reduces the magnetic stray field and thus enhances the electromagnetic compatibility (EMC) of the system.

The wireless power transmission system comprises a base unit with multiple magnetic field generator circuits and at least one device, separable from said base unit and having a receiving inductor, adapted to receive power inductively when said device is in proximity to one of said generator circuits.

To transfer power, at least one of the magnetic field generator circuits is operated to generate a magnetic field, which induces a current in the receiving inductor of the device, hereinafter referred to as "transmission circuit". To obtain an efficient energy transfer, the device and thus the receiving inductor, has to be in physical proximity to the transmission circuit, i.e. in the near-field region of the magnetic field of the transmission circuit. In case the generator circuits are provided as conductor loops or windings, the distance between receiving inductor and the transmission circuit should preferably be in a range of up to ¼ of the diameter of the loop or winding.

The base unit further comprises a controller configured to determine the transmission circuit from said generator circuits, when said receiving inductor is in proximity to said transmission circuit. The controller thus individually determines whether or not a device with a receiving inductor is near one of the generator circuits, so that a wireless power transmission is necessary.

The controller may be of any suitable type for controlling the base unit, such as a microcontroller or a computer. The controller may preferably be an integral part of the base unit, although it is possible that the controller is an external unit, such as a separate computer, wired and/or wirelessly connected to the base unit.

The transmission circuit is then operated to generate a first magnetic field, having a first phase, i.e. the first magnetic field having a magnetic flux with a first phase, for inducing a current in said receiving inductor. The current may then for example be provided in the device for powering the electric or electronic components of the device or to charge a rechargeable battery.

At least one of the remaining generator circuits is operated as a compensation circuit to generate a second magnetic field, having an opposite phase to said first phase, i.e. the second magnetic field having a magnetic flux with a second phase, opposite to said first phase. In the context of the present invention, under the term "opposite phase", a phase-difference of 180° to said first phase is understood. Because of the opposite phase, the magnetic flux of the first and the second magnetic field are in opposite directions at all times. The second magnetic field thus serves to compensate the first magnetic field in the region of magnetic far-field, which advantageously reduces the stray field emitted by the system, while enabling an efficient power transfer to the device in the near-field region.

In addition to the far-field compensation effect, the operation of at least one of the generator circuits as compensation circuits to obtain the second magnetic field in anti-phase to said first magnetic field may enhance the magnetic flux amplitude of the transmission circuit in the near-field region and thus further improves the inductive power transfer to the device. This effect is especially large in case the compensation circuits are located close or adjacent to the respective transmission circuits, which is therefore preferred.

Naturally, more than one transmission circuits may be operated simultaneously, in case more than one device is in proximity to a respective transmission circuit for parallel power transfer to multiple devices. In this case, the compensation circuit is operated so that the phase of the second magnetic field is opposite to the phase of the sum of the magnetic fields of said multiple transmission circuits.

Further, more than one of the generator circuits may be operated as compensation circuits for enhanced compensation efficiency. The remaining generator circuits of the system not operated as transmission or compensation circuit may preferably be operated to generate only weak magnetic fields to further reduce the stray field of the system. Most preferred the remaining generator circuits are switched-off.

As mentioned above, the second magnetic field has a phase, opposite to said first phase to obtain cancellation of the magnetic field in the far-field region. To obtain said second magnetic field with opposite phase, any method, known in the art may be used. Preferably, the compensation circuit is operated with an electric signal which corresponds to the signal provided for the transmission circuit, but which is in opposite phase to said signal, i.e. phase-shifted by 180°.

The base unit may comprise further components, such as further control circuitry or one or more signal generators, connected to the field generator circuits for providing said field generator circuits with an electrical current for the generation of the respective magnetic fields.

To obtain cancellation of the fields in the region of magnetic far-field with enhanced efficiency, the transmission circuit and the at least one compensation circuit is preferably operated, so that the amplitude of magnetic flux of the first magnetic field, based on the flux density and surface area of the transmission circuit, corresponds to the amplitude of magnetic flux of the second magnetic field, based on the flux density and surface area of the compensation circuit. In this case, the sum of the magnetic dipole moments of said first and second magnetic fields cancel each other out in the magnetic far-field with an enhanced efficiency. In the case that the transmission circuit and the at least one compensation circuit are provided as coils, the magnetic flux of the first magnetic field preferably corresponds to the magnetic flux of the second magnetic field, based on the flux density and cross sectional area of the respective coils.

In the context of the present invention, the term "corresponds" referring to magnetic flux is understood to comprise equal amplitudes of the magnetic flux of said first and second magnetic fields, but also includes deviations of ±50%, preferably ±20% most preferably ±10% and ±5%. Choosing the magnetic flux in the above ranges results in a still reasonable reduction of the magnetic far-field.

In the case of operation of more than one transmission circuit or more than one compensation circuit, the transmission circuits and the compensation circuits are operated, so that the magnetic flux of the first magnetic field, i.e. the amplitude of magnetic flux, generated by all transmission circuits, preferably corresponds to the amplitude of magnetic flux of the second magnetic field, i.e. the sum of magnetic flux, generated by all compensation circuits. As mentioned before, the magnetic flux of said first magnetic field corresponds to the magnetic flux of said second magnetic fields, based on the flux density and surface area of the respective transmission and compensation circuits.

The magnetic field generator circuits may be of any suitable type, able to efficiently generate a magnetic field; e.g. a simple conductor loop or one or more windings of such conductor. Preferably, said generator circuits each comprise a coil with multiple windings for generating the magnetic field. Using a coil, it is possible to effectively generate said magnetic field and to provide suitable field intensity for an efficient power transfer to the device. According to a development of the invention, the coils are provided in a printed circuit board (PCB) in one or more layers of said PCB. Preferably, the coils are planar coils, i.e. provided in a single layer of a PCB, which enables a cost-efficient manufacture.

The receiving inductor may be any type of conductor, able to receive power inductively, such as for example a simple wire loop or a circuit provided on a PCB. Preferred, the receiving inductor is a coil.

As mentioned above, the efficiency of the system is advantageously further enhanced when the amplitude of magnetic flux of the second magnetic field is close or equal to the amplitude of magnetic flux of the first magnetic field. Therefore, it is preferred, that the voltage, applied to the transmission circuit corresponds to the voltage, applied to the compensation circuit. In addition or alternatively thereto and in the case that said generator circuits each comprise a coil with multiple windings, preferably the number of windings of the transmission circuit corresponds to the number of windings of the compensation circuit. If more than one transmission circuit or more than one compensation circuit is operated, the total number of windings of all transmission circuits should most preferably match the total number of windings of all compensation circuits.

The device may be any type of electrical or electronic device, which needs electrical power for its operation. Preferably, the device is a mobile, i.e. portable device or a device, which cannot be connected directly to the mains supply, for example in the field of medical applications. Most preferred, said device is a mobile device comprising energy storing means connected to said receiving inductor for charging said energy storing means. The energy storing means may be of any suitable type, for example a rechargeable battery or a capacitor, e.g. a "supercap" capacitor.

To detect the proximity of the device to the transmission circuit, any method, known in the art can be applied. For example, the controller may provide a small current to each of the generator circuits and may detect the presence of a device by monitoring the condition of each circuit.

According to a preferred embodiment of the invention, each generator circuit has an associated detector connected to the controller for detecting the proximity of the receiving inductor to the corresponding generator circuit. Such a set-up allows to efficiently determining the proximity of a device to the transmission circuit.

The detectors may be of any suitable type for detecting the proximity of the device, for example by means of a change in weight using a pressure detector, by means of a change in an electric or magnetic field using a field detector, by means of ultrasonic waves or by optical detection. Preferably, the detector is a field detector and comprises a parallel resonant circuit. In this case the device is provided with a magnetic component, e.g. a soft-magnetic plate. When the device is brought in proximity of the resonant circuit, the inductivity of said resonant circuit is increased. It is then possible to detect a change in the impedance or in the resonance frequency of the resonant circuit, allowing to detect the proximity of the device.

Most preferably, the detectors are RFID detectors and the device comprises an RFID tag. The present embodiment advantageously allows to detect a device and to transfer additional data between the device and the base unit, e.g. the type of device, the current needed, time of power transfer or any other information for allowing to enhance the efficiency of the system. The information comprised in the RFID tag may preferably be used by the controller to operate the transmission circuit and the compensation circuit accordingly. For example, the RFID tag may comprise charging time information, which is transferred to the controller, which then operates the transmission and compensation circuits for the specific duration.

According to a preferred embodiment of the invention, the generator circuits are arranged in a plane, forming a transmission area. This set-up allows an efficient manufacture of the base unit and thus the power transmission system. Further, the set-up allows forming a planar surface for accommodating one or more devices.

For an efficient cancellation of the magnetic far-field, said compensation circuit preferably comprises at least one conductor winding, arranged on a periphery of said transmission area to generate said second magnetic field. Most preferably, the at least one conductor winding is formed as a substantially closed loop, which surrounds the transmission area, i.e. the area in which the transmission circuit and the remaining generator circuits are arranged. The present set-up allows an efficient cancellation of the magnetic far-field while maintaining a sufficient magnetic near-field for the power transmission to the device. Certainly, such a compensation circuit may comprise more than one conductor winding or may preferably comprise multiple conductor windings with intermediate taps, so that it is possible to vary the number of conductor windings operated and thus enabling to vary the magnetic flux of said second magnetic field without any change in the set-up. Such a design may be useful when for example the number of operated transmission circuits is varied and thus the total magnetic flux of the transmission circuits to be compensated is varied accordingly.

Alternatively, the controller may be configured to determine at least one compensation circuit from said multiple generator circuits, so that said transmission circuit and said compensation circuit are adjacent to each other. In the context of the present invention, the term "adjacent to each other" means that the compensation circuit and the transmission circuit are directly adjoining, without a further generator circuit between them. Also with this set up, the magnetic far-field is reduced efficiently. In addition thereto and as mentioned before, the present embodiment advantageously further enhances the power transfer to the device.

Naturally, the controller may be configured to determine more than one compensation circuit, adjacent to the transmission circuit in a manner, so that said multiple compensation circuits surround the transmission circuit at least partly.

The adjacent generator circuits may preferably be arranged overlapping. Most preferred the field generator circuits may be arranged in multiple layers. For example, a first layer may be provided in which the transmission circuit is arranged and at least a second layer may be provided in which the at least one compensation circuit is arranged. In addition thereto, the transmission circuits and/or the compensation circuits may preferably be arranged at least partly overlapping in a direction, perpendicular to the first and/or second layer.

As mentioned before, the compensation circuits may be operated with a signal which corresponds to the signal provided for the transmission circuit, but which is in opposite phase to said signal. To obtain an efficient reduction of the magnetic far-field, the total current, which passes through the one or more compensation circuits preferably, corresponds to the current that passes through the one or more transmission circuits.

In an alternative embodiment, it is preferred that said base unit comprises a sensor connected to the controller, for sensing the magnetic field, i.e. the magnetic flux. It is thus possible to actively control the one or more compensation circuits to minimize the magnetic far-field of the transmission circuit according to the sensed field. Such an active control—or "closed-loop" control—may be obtained by varying the voltage of the compensation circuits. In the case that the compensation circuits are coils, alternatively or additionally to a control of the voltage, the number of conductor windings may be varied to control or set the magnetic flux of said second magnetic field. Exemplary, the sensor may be a hall sensor or a simple coil with a suitable field detecting circuit.

To enable measuring the far-field more precisely and thus to further enhance the reduction of the magnetic far-field, the sensor is most preferably provided in a defined distance to the transmission circuit. For instance, the sensor may be arranged on the periphery of said transmission area or of the base unit, or it may even be provided in a separate unit, connected to the base unit, but which may be placed in a defined distance to the base unit.

The above and other objects, features and advantages of the present invention will become apparent from the following description of preferred embodiments.

BRIEF DESCRIPTION OF THE DRAWINGS

FIG. 2a shows a schematic plan view of a second embodiment of the invention in an operational state, FIGS. 3a and 3b show a schematic circuit diagram of the embodiment of FIG. 2a, FIG. 4a shows a schematic plan view of a third embodiment in an operational state, FIGS. 6a and 6b show a schematic circuit diagram of the embodiment of FIG. 5, FIGS. 7a and 7b show a schematic circuit diagram of a fifth embodiment

DETAILED DESCRIPTION OF EMBODIMENTS

Figure 1:
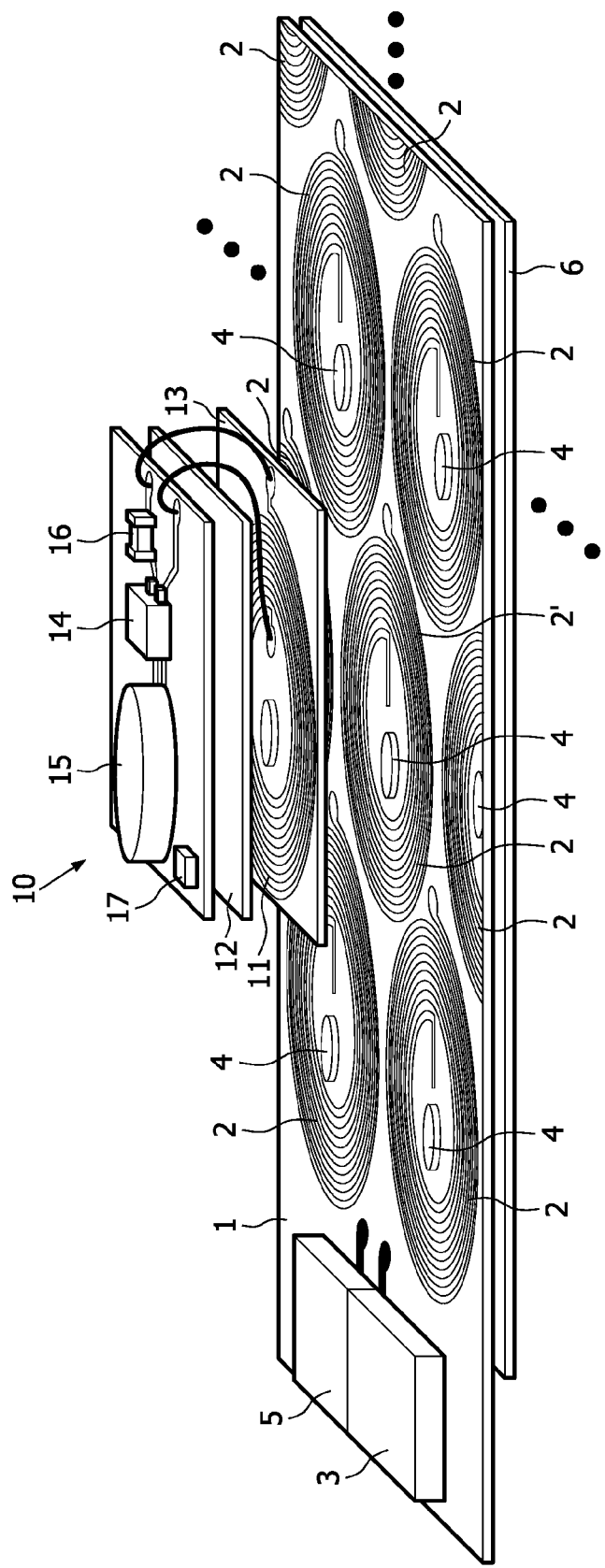
FIG. 1 shows a first embodiment of a wireless power transmission system according to the invention in a three-dimensional exploded view.

According to FIG. 1, a base unit 1 is provided with multiple magnetic field generator circuits, i.e. planar spiral coils 2, arranged in a single layer of a printed circuit board of the base unit 1. The coils 2 are connected to a controller 3, which may be e.g. a microcontroller. The connections (not shown) may e.g. be provided in a further layer of a multilayer printed circuit board or by a suitable wiring. The controller 3 is connected to a power supply unit 5 to provide the coils 2 with a defined ac voltage for generating alternating magnetic fields. A soft-magnetic plate 6 is provided on the lower side of the base unit 1 to reduce magnetic stray fields. Each coil 2 has an associated detector 4, e.g. an RFID detector, connected to the controller 3 and arranged in the center of each associated coil 2. The detectors 4 are configured to detect the proximity of a device 10, which is shown in FIG. 1 in an exploded view for illustration purposes.

The device 10 comprises a receiving inductor, i.e. a planar spiral receiving coil 11, provided in a layer 13 of a printed circuit board. A soft-magnetic plate 12 is arranged on top of the planar coil 11 to shield the magnetic field of the coils 2 from the remaining components of the device 10, as explained below. The receiving coil 11 is connected to a rectifier 14, which connects the receiving coil 11 to a rechargeable battery 15. A capacitor 16 is provided in series thereto to enhance the coupling efficiency of the magnetic fields. To allow detection of the proximity of the device 10 to one of the coils 2, the device 10 comprises an RFID tag 17, which is detectable by the detectors 4 when in proximity. The RFID tag 17 further comprises charging information of the device 10. Such charging information may comprise information about the voltage needed, the charging time or any other parameter, which may be used by the controller 3 to enhance the power transfer to the device 10.

When the device 10 is in proximity to one of the coils 2, the associated detector 4 of the coil 2 detects the presence of the RFID tag 17 and thus of the device 10. The controller 3 then provides the coil 2 with an ac voltage, generated by the power supply unit 5, so that the coil 2 is operated as a transmission circuit 2'. The transmission circuit 2' thus generates a first alternating magnetic field 8, which induces a current in the receiving coil 11 for recharging the battery 15. To reduce the magnetic stray field, the controller 3 supplies at least one of the remaining coils 2 with an ac voltage in opposite phase, so that a second magnetic field is generated, having an opposite phase to said first phase. Thus, the magnetic far-field is reduced efficiently. As can be taken from the figure, the base unit 1 is scalable and not limited to a specific number of coils 2, which may vary depending on the application, for example a rather large base unit 1 with a high number of coils 2 may be used in case a plurality of devices 10 need to be powered at the same time.

Figure 2A:
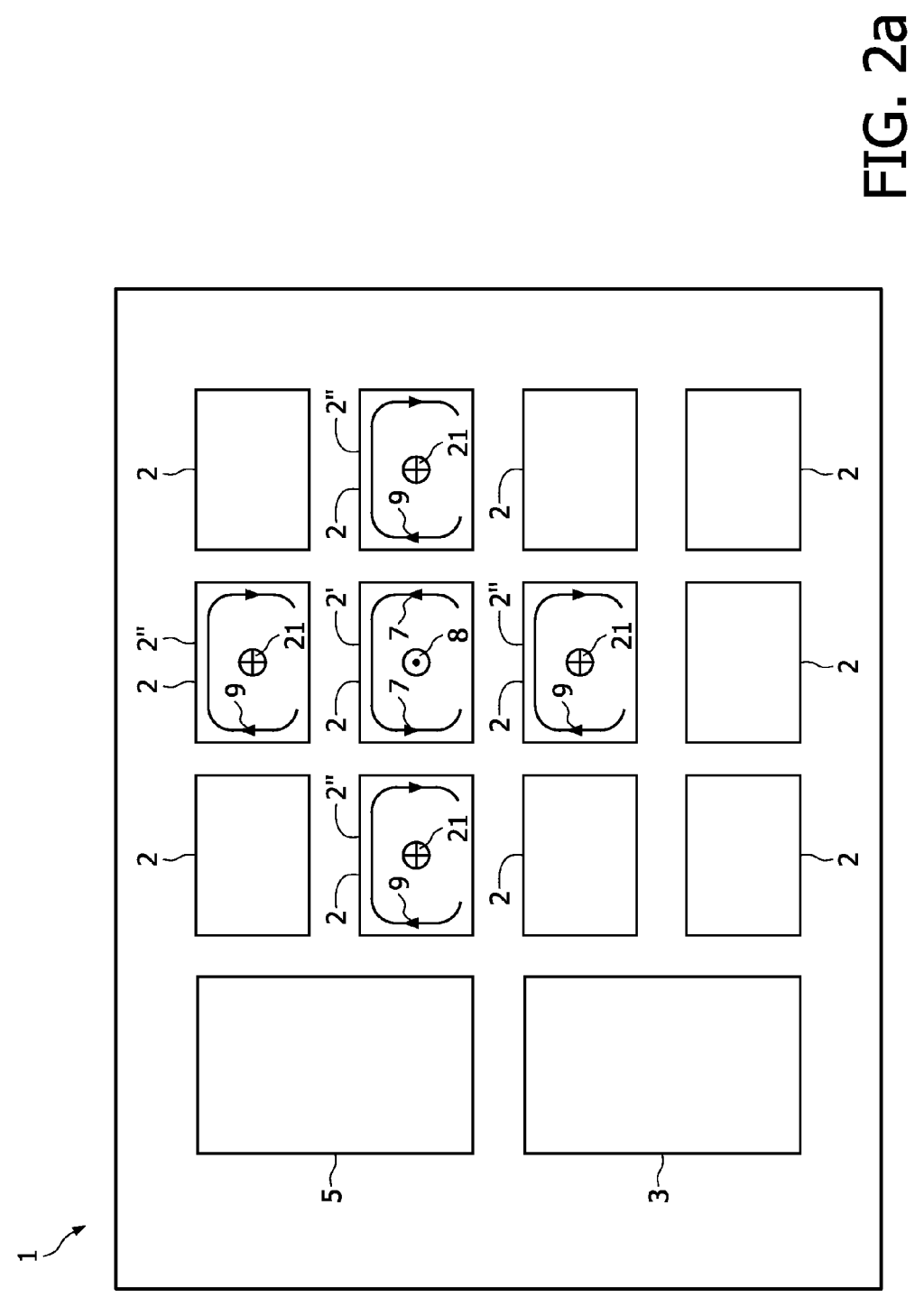
Figure 2B:
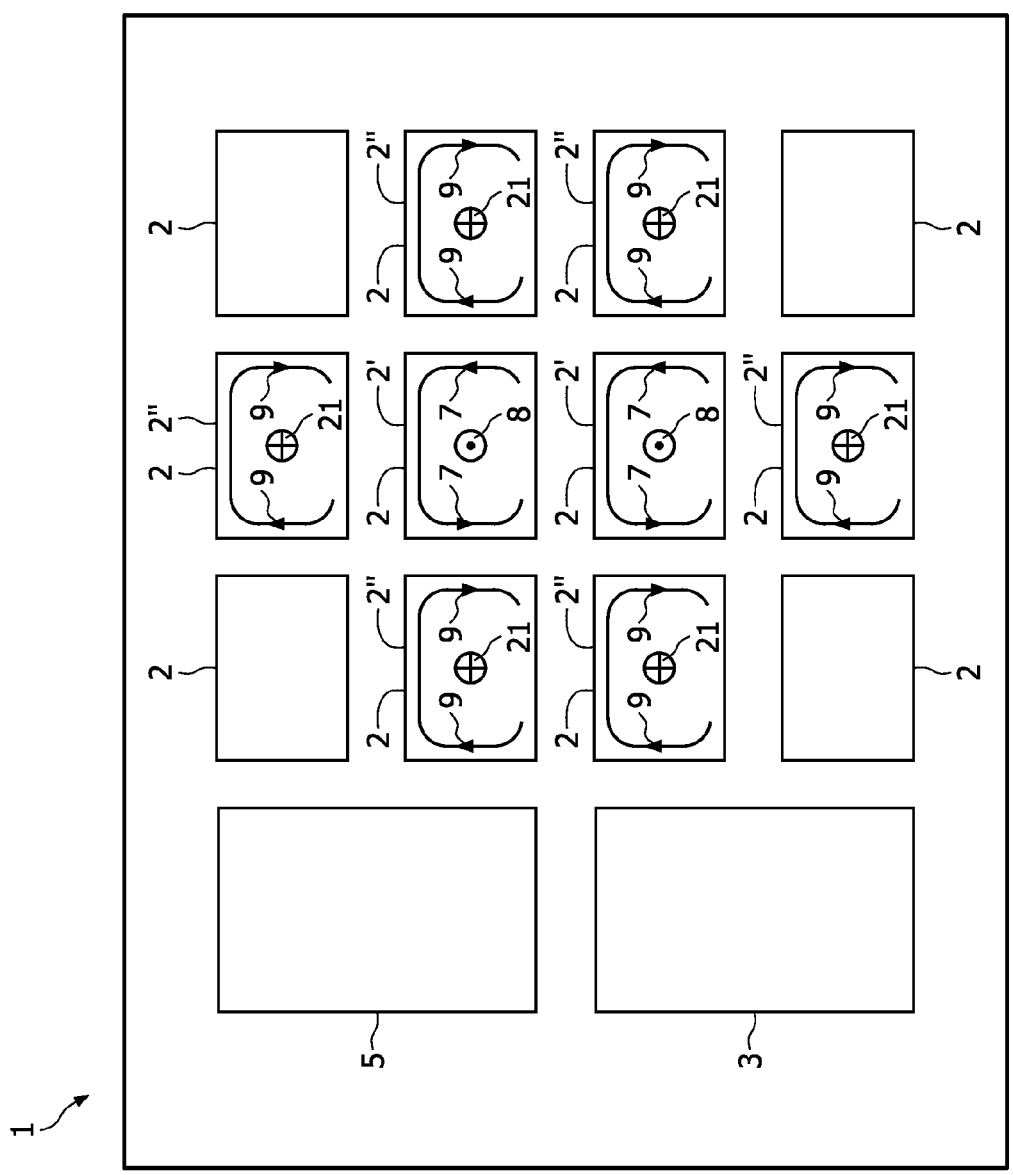
FIG. 2b shows a schematic plan view of the embodiment of FIG. 2a in a second operational state.
Figure 2C:
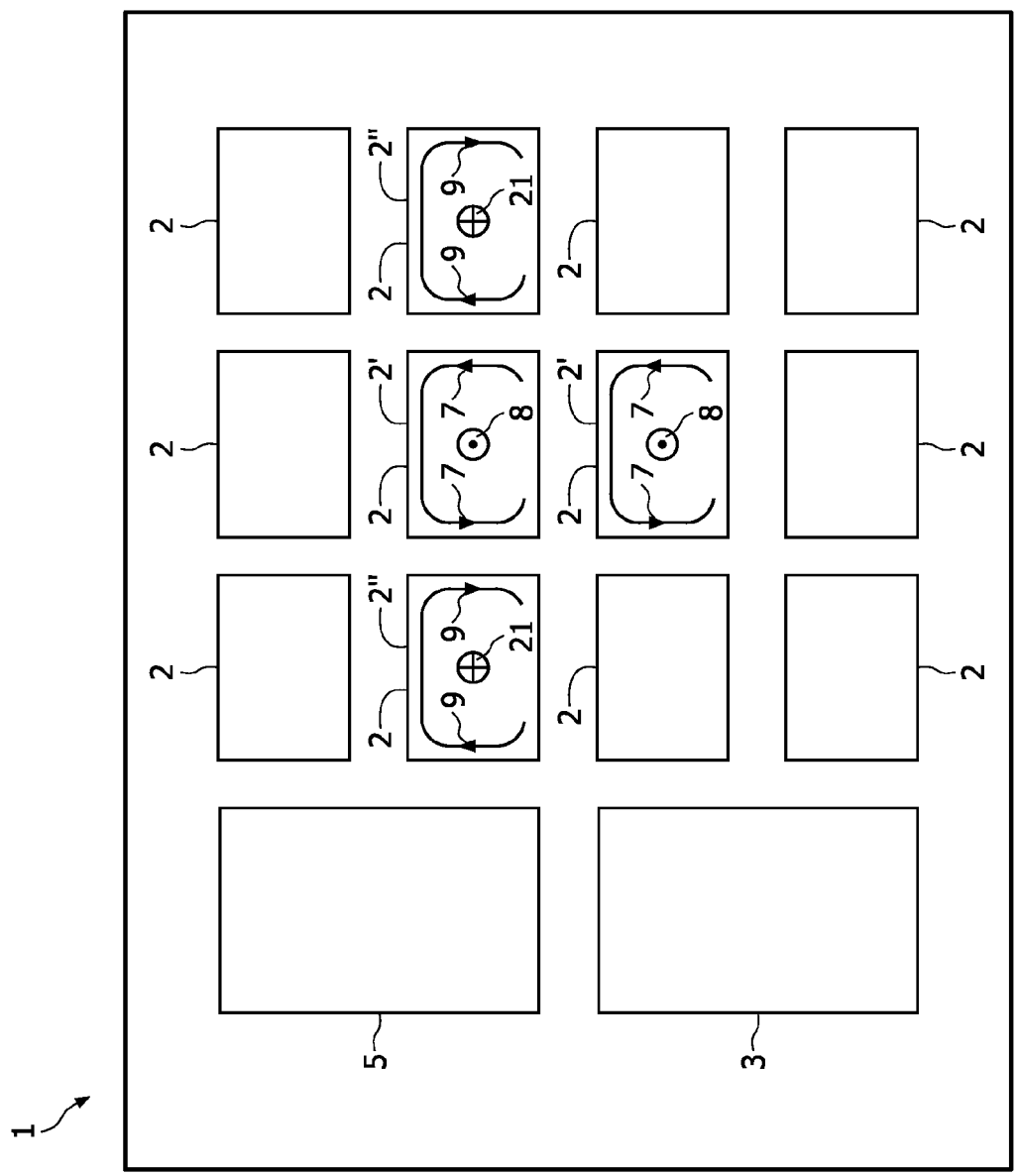
FIG. 2c shows a schematic plan view of the embodiment of FIG. 2a in a further operational state.

Further details of the invention are explained with reference to the FIGS. 2a-2c, which show schematic plan views of a second embodiment of a wireless power transmission system in multiple operational states. Since alternating fields are used to induce a current in the receiving coil 11, FIG. 2a-2c show "snapshots" of the system at a given moment of time, to clarify the operation of the system.

According to the embodiment of FIG. 2a, a base unit 1 with an array of 3×4 coils 2 is provided to wirelessly transfer power to one or more devices 10 (not shown). One of the coils 2 is operated as a transmission circuit 2' by the controller 3 to transfer power to a device 10 (not shown), arranged on top of the transmission circuit 2'. The transmission circuit 2' is therefore supplied by the controller 3 with a first signal having a first phase, i.e. according to the "snapshot" of FIG. 2 in a first direction, as indicated by the arrows 7 and thus a first magnetic field 8 with a first phase, i.e. a first direction, is generated.

Four coils 2, adjacent to the transmission circuit 2' are operated as compensation circuits 2". The compensation circuits 2" are supplied by the controller 3 with a signal, corresponding to the first signal, but having an opposite phase, i.e. an opposite direction at all times, as indicated by arrows 9. The compensation circuits 2" thus generate a second magnetic field 21, having an opposite phase to said first magnetic field 8. Thus, the first magnetic field 8 is compensated in the far-field region by said second magnetic field 21. In addition to the far-field compensation effect, the arrangement of the compensation circuits 2" adjacent to the transmission circuit 2' enhances the first magnetic field 8 and thus the power transmission to the device 10. FIGS. 2b and 2c show the embodiment of FIG. 2a in further operational states with two coils 2, operated as transmission circuits 2", and multiple compensation circuits 2", arranged adjacent to the two transmission circuits 2". It is thus possible to transfer power to more than one device 10 (not shown) at the same time, placed on top of the respective transmission circuit 2'.

FIGS. 3a and 3b show schematic circuit diagrams of the embodiment of FIG. 2a. As can be taken from the figure, each coil 2 is connected to the power supply unit 5 by switches 31, which are controlled by the controller 2. Each coil 2 can thus be connected to the supply ac voltage either in positive or reverse direction. FIG. 3a shows the arrangement in an "off" state; all switches 31 are open. The operational state shown in FIG. 3b corresponds to the state of FIG. 2c. Two of the coils 2 are connected as transmission circuits 2' for generation of the first magnetic field 8 and the two neighbored, i.e. adjacent ones are connected in opposite phase, i.e. according to the "snapshot" of FIG. 3b in reverse direction as compensation circuits 2"—as indicated by the arrows in FIG. 3b—to compensate the magnetic far-field of the first magnetic field 8. The switches 31 are set accordingly to connect the respective coils 2 in opposing directions to the power supply unit 5.

To enhance the compensation of the first magnetic field 8 in the far-field region, the sum of the magnetic flux of the second magnetic field generated by the compensation circuits 2", herein denoted as $\Phi_C$ should be equal in amplitude but in opposite direction of the magnetic flux generated by the power transmission circuits 2' at all times, denoted as $\Phi_{Tx}$:

$$\Phi_{Tx} = -\Phi_C \quad (1)$$

In general, the magnetic flux $\Phi$ generated by a coil 2 is related to the applied voltage U to the coil 2:

$$U = N \cdot \frac{d}{dt}\phi, \quad (2)$$

where N=Number of turns of the coil 2. The diameter of the coil 2 has no relevance.

For sinusoidal flux and voltage the equation can be expressed as a function of frequency f using complex numbers:

$$U = j \cdot 2\pi \cdot f \cdot N \cdot \phi \quad (3)$$

For a two coil 2 system with one transmission circuit 2' and one compensation circuit 2", operating at the same frequency f, the condition for far-field cancellation can easily be expressed as:

$$\frac{U_{Tx}}{N_{Tx}} = \frac{-U_C}{N_C}, \quad (4)$$

where index Tx is related to the transmission circuit 2' and index C is related to the compensation circuit 2". If there exist a number of active transmission circuits 2' ($n_{Tx}$) and a number of compensation circuits 2" ($n_C$), the sum all magnetic flux contributions of the transmission circuits 2' should be equal to the sum of the flux of all compensation circuits 2". Expressed as equation this is:

$$\sum_{i=1}^{n_{Tx}} \phi_{Tx}(i) = \sum_{k=1}^{n_C} -\phi_C(k). \quad (5)$$

If the coils 2 are not very well coupled in the near field, equation (4) is applicable and a rule for a technical realization can be expressed as:

$$\sum_{i=1}^{n_{Tx}} \frac{U_{Tx}(i)}{N_{Tx}(i)} = \sum_{k=1}^{n_C} \frac{-U_C(k)}{N_C(k)}. \quad (6)$$

In the case that identical coils 2 with a corresponding number of windings are used for power transmission, i.e. as transmission circuits 2', and field compensation, i.e. as compensation circuits 2", a simple control method is to connect the same number of coils 2 as switched on for the power transmission as compensation circuits, but in reverse direction, as shown in FIGS. 2c and 3b.

Figure 4A:
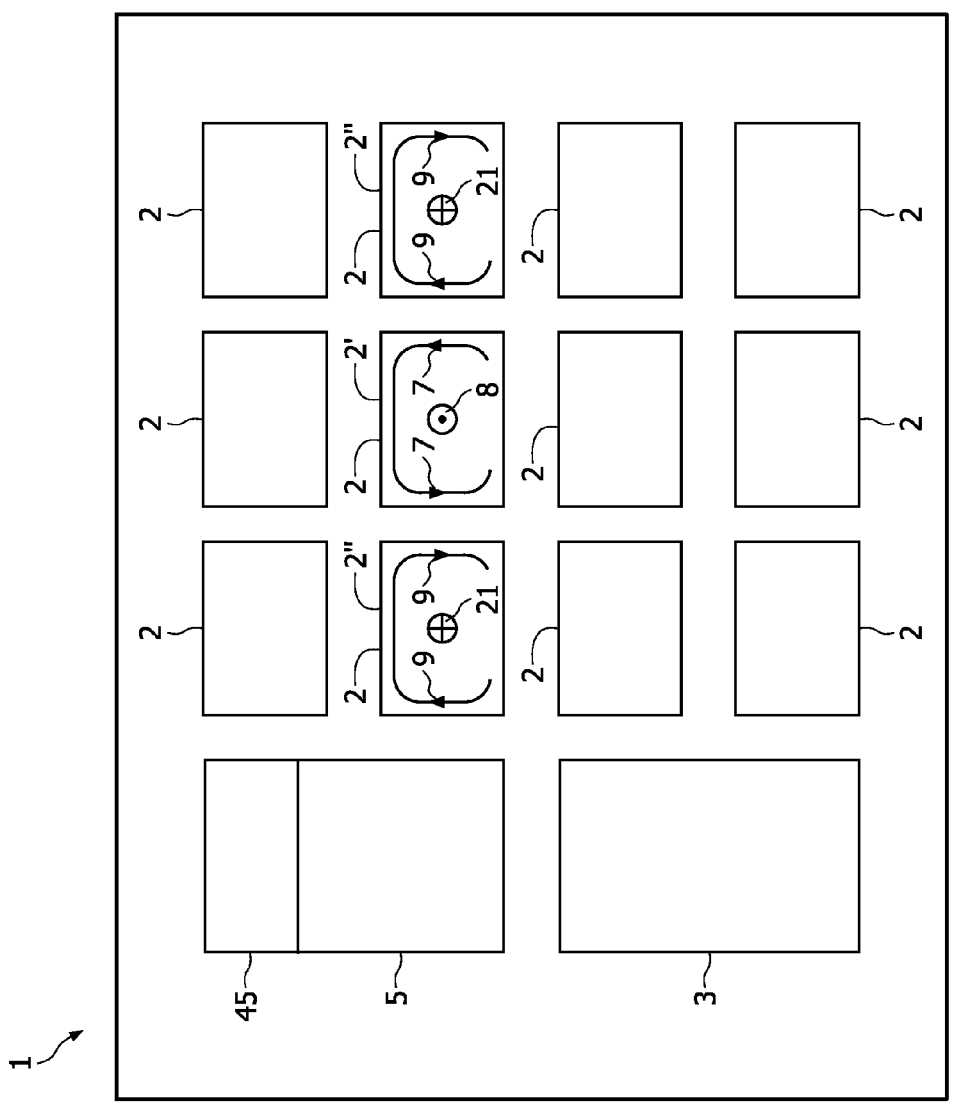
FIGS. 4b and 4c show a schematic circuit diagram the embodiments of FIG. 4a, FIG. 5 shows a fourth embodiment of a wireless power transmission system according to the invention in a schematic plan view.
Figure 4B:
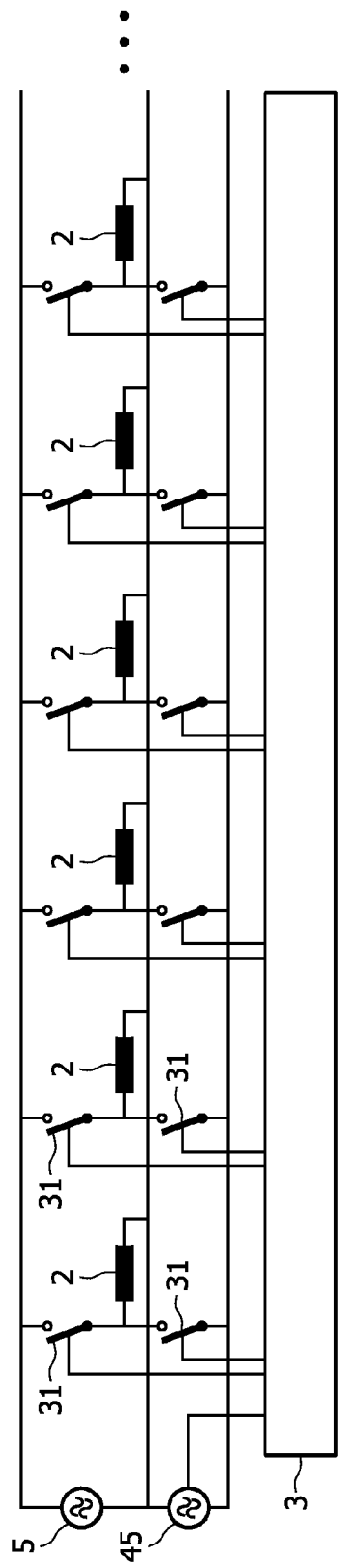
Figure 4C:
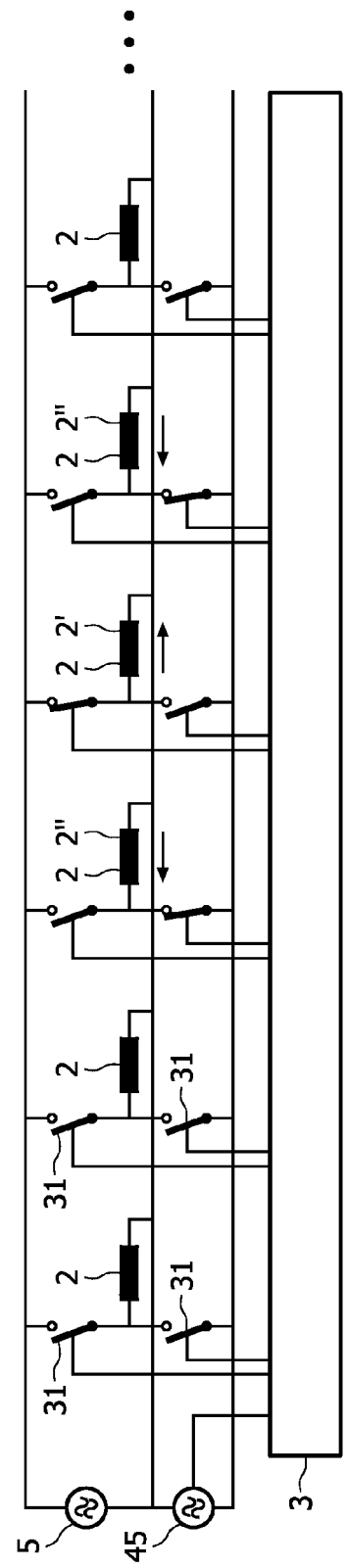

To further enhance the compensation efficiency, it is possible to provide a separate controllable compensation power supply unit 45, as shown in FIG. 4a-4c. FIG. 4a shows a schematic plan view of a third embodiment in an operational state. The basic set up of the power transmission system according to the embodiment of FIG. 4a corresponds to the embodiment of FIG. 2a, especially the arrangement of the coils 2.

Each coil 2 can be connected either to the power supply unit 5, which provides the transmission coils 2' with an ac voltage for power transmission (Ugen) or to the controllable compensation power supply 45 for providing an ac compensation voltage (Uc) to the compensation circuits 2" using switches 31, as can be taken from FIG. 4b, which shows a schematic circuit diagram of the embodiment according to FIG. 4a. The controller 3 sets the compensation voltage according to equation (6), depending on the number of activated transmission circuits 2' and compensation circuits 2" and their properties, as mentioned above.

FIG. 4c shows a "snapshot" of the third embodiment in the operational state according to FIG. 4a, where some of the coils 2 are activated. Only one transmission circuit 2' is activated, but two neighbored coils 2 are connected to the ac compensation voltage as compensation circuits 2". In this example all coils 2 have equal properties, i.e. number of windings, thus the controller 3 sets the absolute value of the compensation voltage Uc=½ Ugen.

Figure 5:
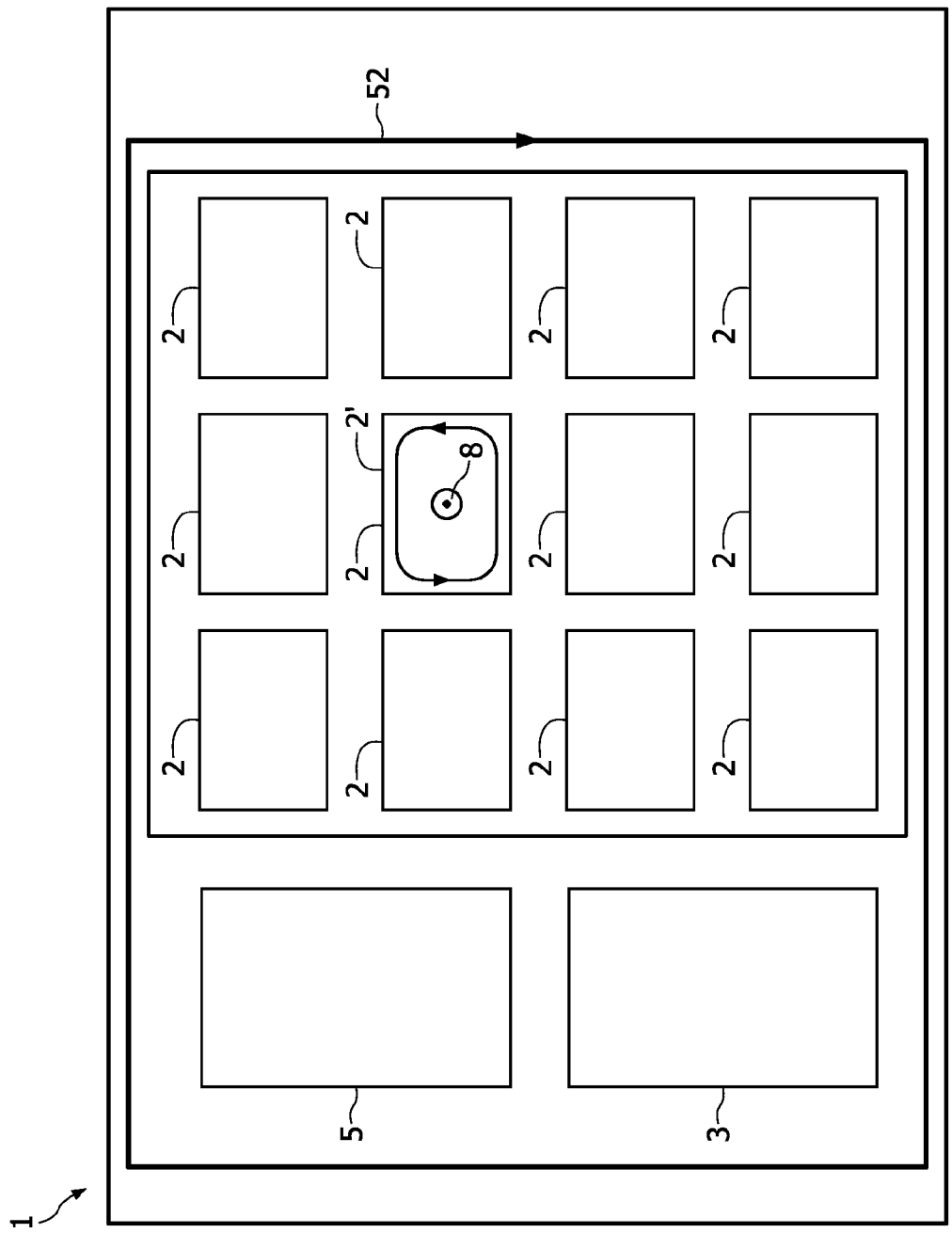

Alternatively to operating the coils 2 either as transmission circuits 2' or as compensation circuits 2", it is possible to provide a dedicated compensation circuit 52, as shown in FIG. 5.

FIG. 5 shows a fourth embodiment of a wireless power transmission system according to the invention in a schematic plan view in an operational state. In contrast to the embodiment of FIG. 2a, a dedicated compensation circuit 52 is provided on a periphery of the base unit 1, forming a transmission area, in which the coils 2 are arranged. The compensation circuit 52 is formed by a coil with multiple windings for generating the second magnetic field 21, which provides compensation in the magnetic far-field for the first magnetic field 8, generated by the one or more transmission circuits 2'. The compensation circuit 52 has the same number of turns as each of the coils 2. The coils 2 and the compensation circuit 52 are provided with an ac voltage by power supply unit 5.

FIGS. 6a and 6b show a schematic circuit diagram of the embodiment of FIG. 5. Each coil 2 can be switched to the ac supply voltage, provided by power supply unit 5. The compensation circuit 52 is connected to the same power supply unit 5, but in reverse direction. The controller 3 controls the switches 31 to activate a coil 2 as a transmission circuit 2' when a device 10 (not shown) is in proximity to the respective coil 2. While FIG. 6a shows the arrangement in the "off" state; FIG. 6b shows a "snapshot" according to FIG. 5, where one transmitting circuit 2' and the compensation circuit 52 is activated. The arrows indicate the direction of the applied voltage. To compensate the magnetic far-field, the ac voltage, applied to the compensation circuit 52 is in opposite phase to the ac voltage, applied to the transmission circuit 2', i.e. in opposite direction according to the "snapshot" of FIG. 6b, as indicated by the arrows in the figure.

Alternatively, to further enhance the compensation efficiency, it is possible to provide a separate controllable compensation power supply unit 75, as shown in the FIGS. 7a and 7b, which show a schematic circuit diagram of a fifth embodiment of the invention. The basic set up of the power transmission system according to the embodiment of FIGS. 7a and 7b corresponds to the embodiment of FIG. 5, especially the arrangement of the coils 2 and the compensation circuit 52.

The controller 3 controls the compensation power supply unit 75. The controller 3 sets the compensation ac voltage according to equation (6), depending on the number of activated transmission circuits 2' and the properties of the compensation circuit 52. FIG. 7b shows a "snapshot" of the embodiment of FIG. 7a in an operational state, where two transmission circuits 2' are activated. If the compensation circuit 52 has the same number of windings, the absolute value of the compensation voltage (Uc) must be Uc=2×Ugen (voltage supplied to the transmission circuit 2'), as indicated by the arrows in the figure. As an advantage of this solution, the compensation circuit 52 may have a different number of windings than the coils 2, and is thus more flexible.

Figure 8A:
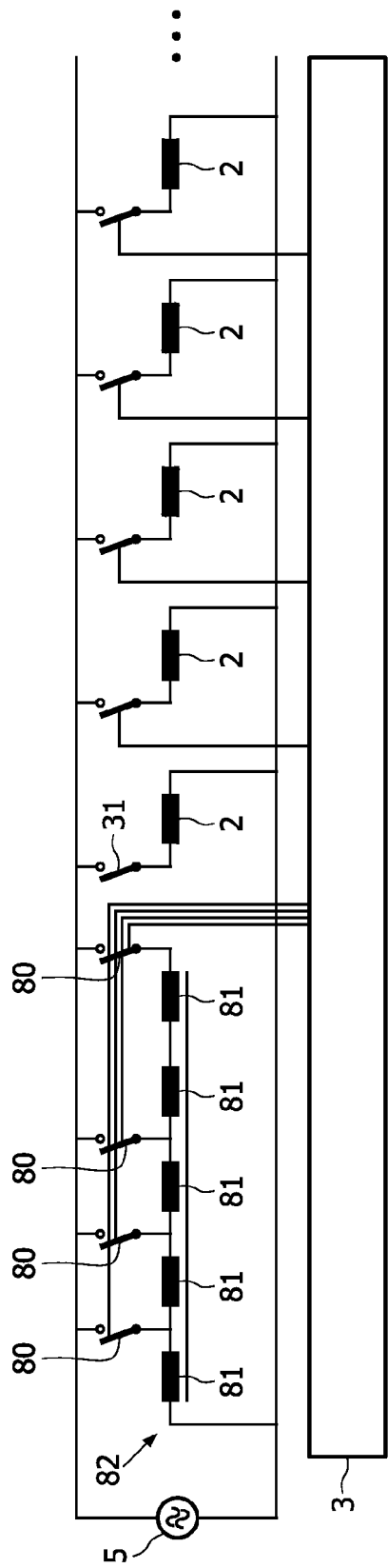
FIGS. 8a and 8b show a schematic circuit diagram of a sixth embodiment.
Figure 8B:
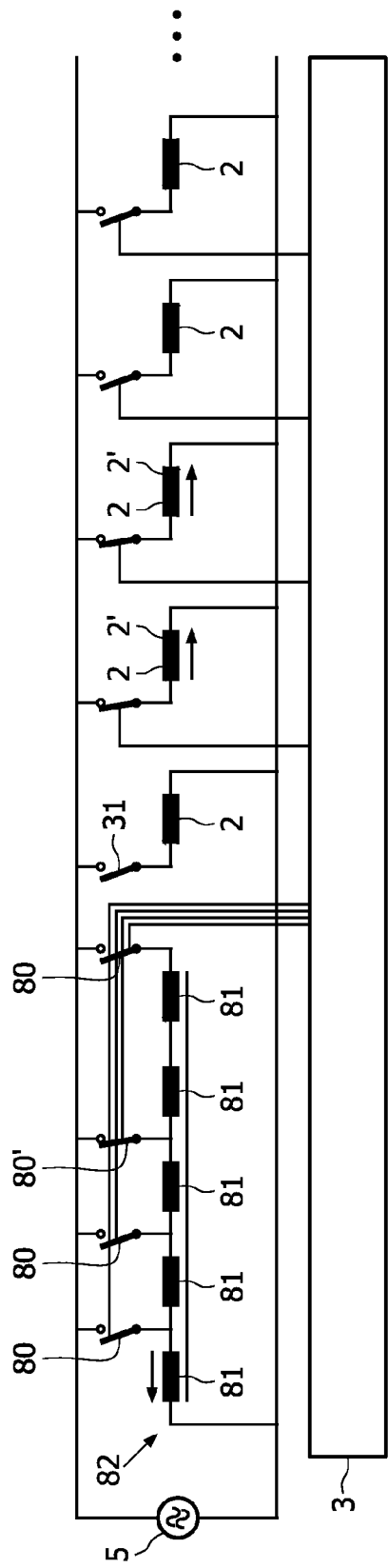

FIGS. 8a and 8b show a schematic circuit diagram of a further embodiment of the invention with a single compensation circuit 82. The basic set up of the power transmission system according to the embodiment of FIGS. 8a and 8b corresponds to the embodiment of the FIG. 5, especially the arrangement of the coils 2 and the compensation circuit 82.

This solution makes use of equation (6) by adjusting the number of windings of the compensation circuit 82. The complete compensation circuit 82 has the same number of turns 81 as all coils 2. However, as shown in FIG. 8a, additional switches 80 allow connecting only a fraction of the compensation windings to the generator ac voltage of the power supply unit 5. For example, if two transmission circuits 2' are activated, only ½ of the compensation turns 81 are activated. If three transmission circuits 2' are activated, only ⅓ of the compensation turns 81 are activated and so forth. The turns of the compensation circuit 82 are closely coupled, as indicated by the bold line underneath the individual compensation inductors, representing the fractions of the winding. FIG. 8b shows a "snapshot" of the embodiment of FIG. 8a in an operational state, where two transmission circuits 2' are activated. As shown, the switch 80' connects half of the turns 81 of the compensation circuit 82 to the supply unit 5 and thus to the ac generator voltage.

While the invention has been illustrated and described in detail in the drawings and foregoing description, such illustration and description are to be considered illustrative or exemplary and not restrictive. All or some of the embodiments or features of single embodiments may be combined without restriction. The invention is not limited to the disclosed embodiments.

For example, it is possible to operate the invention according to the above embodiments wherein the controller 3 is provided as an external unit, e.g. a microcontroller or computer, the detectors 4 are pressure detectors, field detectors, ultrasonic proximity detectors or optical detectors and the device 10 is adapted thereto, the coils 2 are provided in multiple layers of a printed circuit board or are provided as discrete coils, the soft-magnetic plates 6, 12 comprise a plastic ferrite compound material or a structured high permeable metal foil, made from mumetal, metglas or nanocristalline iron, the soft-magnetic plates 6, 12 are provided as layers of the printed circuit board the device 10 comprises no or an alternative energy storing means instead of the battery 15, e.g. a "supercap" capacitor, the switches 31, 80 and 80' are provided as relays or transistors, e.g. of FET or MOSFET and/or the generator circuits are arranged in multiple layers.

In addition, it is possible to operate the invention according to the above embodiments, where the ac compensation voltage, provided to the compensation circuits 2", 52 or 82 is not determined by equation (6). Instead, during a calibration run (e.g. in the factory or in the lab) the optimal ac compensation voltage is determined for each combination of activated transmission circuits 2'. This optimal configuration is stored in the controller 3 and used during operation. The optimal setting is determined using a magnetic field sensor located in the far-field. The ac compensation voltage is varied until a minimum magnetic field is measured.

Alternatively or additionally thereto, the ac compensation voltage, provided to the compensation circuits 2", 52 or 82 is determined in a closed-loop or active operation, where the magnetic far-field is sensed using a suitable sensor, e.g. a hall sensor, connected to the controller 3. The sensor may be located sufficiently far away from the coils 2, e.g. at the outer edge of the base unit 1 or the transmission area or may be provided in a separate unit, connected either wired or wireless or the controller 3. The controller 3 varies the ac compensation voltage, until an optimum of cancellation is achieved.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Wireless power transmission system comprising:
    a base unit including:
        multiple magnetic field generator circuits; and
        a controller, configured to determine a transmission circuit from said generator circuits to transfer power to a device when a receiving inductor of said device is in proximity to said transmission circuit, whereupon the controller is configured to operate said transmission circuit to generate a first magnetic field, having a first phase, to induce a current in said receiving inductor; and
        said controller is further configured to operate at least first and second ones of the remaining generator circuits as a compensation circuit to generate a second magnetic field, having an opposite phase to said first phase, wherein said controller is further configured to compensate a magnetic far-field of said first magnetic field by controlling a sum of magnetic fluxes generated in the second magnetic field to be substantially equal in magnitude and opposite in direction to a magnetic flux generated in the first magnetic field.

2. The system according to claim 1, wherein said generator circuits each comprise a coil with multiple windings for generating said magnetic fields.

3. The system according to claim 2, wherein the number of windings of the transmission circuit corresponds to the number of windings of the compensation circuit.

4. The system according to claim 1, wherein each generator circuit has an associated detector, connected to the controller, for detecting the proximity of the receiving inductor to the corresponding generator circuit.

5. The system according to claim 4, wherein said detectors are RFID detectors and said device comprises an RFID tag.

6. The system according to claim 1, wherein said generator circuits are arranged in a plane, forming a transmission area.

7. The system according to claim 6, wherein said compensation circuit comprises at least one conductor winding, arranged on a periphery of said transmission area to generate said second magnetic field.

8. The system according to claim 1, wherein the controller is configured to determine said compensation circuit from said multiple generator circuits, so that said transmission circuit and the remaining generator circuits comprising said compensation circuit are adjacent to each other.

9. The system according to claim 1, wherein said base unit comprises a sensor, connected to the controller for sensing far-field effects of the magnetic field, so that said compensation circuit is operated to minimise the magnetic far-field of said transmission circuit in response to a measurement from said sensor.

10. The system according to claim 1, wherein the system further includes said device, which includes said receiving inductor.

11. Method for operating a wireless power transmission system, comprising a base unit, having multiple magnetic field generator circuits, and a device, separable from said base unit having a receiving inductor, adapted to receive power inductively when said device is in proximity to one of said generator circuits, wherein the method comprises:
    determining the proximity of the receiving inductor to a transmission circuit of said generator circuits;
    determining a transmission circuit from said generator circuits to transfer power to a device when a receiving inductor of said device is in proximity to said transmission circuit;
    operating said transmission circuit to generate a first magnetic field, having a first phase, to induce a current in said receiving inductor;
    operating at least first and second ones of the remaining generator circuits as a compensation circuit to generate a second magnetic field, having an opposite phase to said first phase of said first magnetic field; and
    compensating a magnetic far-field of said first magnetic field by controlling a sum of magnetic fluxes generated in the second magnetic field to be substantially equal in magnitude and opposite in direction to a magnetic flux for the first magnetic field.

12. A non-transitory computer-readable medium having one or more executable instructions stored thereon, which when executed by a processor cause the processor to perform a method for operating a wireless power transmission system, the system comprising a base unit having multiple magnetic field generator circuits, and a device, which is separable from said base unit and includes a receiving inductor that is adapted to receive power inductively when said device is in proximity to one of said generator circuits, the method comprising:
    determining the proximity of the receiving inductor to a transmission circuit of said generator circuits;
    determining a transmission circuit from said generator circuits to transfer power to a device when a receiving inductor of said device is in proximity to said transmission circuit;

operating said transmission circuit to generate a first magnetic field, having a first phase, to induce a current in said receiving inductor;

operating at least first and second ones of the remaining generator circuits as a compensation circuit to generate a second magnetic field, having an opposite phase to said first phase of said first magnetic field; and compensating a magnetic far-field of said first magnetic field by controlling a sum of magnetic fluxes generated in the second magnetic field to be substantially equal in magnitude and opposite in direction to a magnetic flux for the first magnetic field.

\* \* \* \* \*